United States Patent
Zhang

(10) Patent No.: US 9,658,392 B2
(45) Date of Patent: May 23, 2017

(54) WATERPROOF BACKLIGHT MODULE

(71) Applicant: Shenzhen China Star Optoelectronics Technology Co., Ltd., Shenzhen, Guangdong (CN)

(72) Inventor: Yanxue Zhang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 193 days.

(21) Appl. No.: 14/428,623

(22) PCT Filed: Jan. 15, 2015

(86) PCT No.: PCT/CN2015/070743
§ 371 (c)(1),
(2) Date: Mar. 16, 2015

(87) PCT Pub. No.: WO2016/106855
PCT Pub. Date: Jul. 7, 2016

(65) Prior Publication Data
US 2016/0341890 A1      Nov. 24, 2016

(30) Foreign Application Priority Data
Dec. 30, 2014  (CN) .......................... 2014 1 0841177

(51) Int. Cl.
*G02F 1/1333* (2006.01)
*F21V 8/00* (2006.01)

(52) U.S. Cl.
CPC ......... *G02B 6/0093* (2013.01); *G02B 6/0055* (2013.01); *G02B 6/0088* (2013.01); *G02F 1/133308* (2013.01); *G02F 2201/50* (2013.01)

(58) Field of Classification Search
CPC ... G02F 2001/133311; G02F 1/133308; G02F 1/1333; G02F 2201/50; G02B 6/0093; G02B 6/0088
See application file for complete search history.

(56) References Cited

U.S. PATENT DOCUMENTS

2007/0188675 A1* 8/2007 Tsubokura ........ G02F 1/133308
                                                              349/58
2014/0177154 A1* 6/2014 Lee ....................... G06F 1/1637
                                                              361/679.26

FOREIGN PATENT DOCUMENTS

CN           203615200 U          5/2014

* cited by examiner

*Primary Examiner* — Karabi Guharay
(74) *Attorney, Agent, or Firm* — Andrew C. Cheng

(57) ABSTRACT

A waterproof backlight module comprises a light guiding plate, a reflection plate at the bottom of the light guiding plate, an optical film and a display panel disposed sequentially above the light guiding plate, and a frame disposed at a flank of the light guiding plate and the optical film, wherein a waterproof sealant is disposed at the flank of the display panel, a connection region where the display panel connects the frame, and a connection gap between the frame and the reflection plate. The waterproof backlight module provided by the present invention can effectively prevent water from entering an electronic mobile device, so that normal operation of electronic device and circuit are not affected. The waterproof backlight module is with small structure modification, easy manufacture and obvious effect, and can improve ability of waterproof of an electronic terminal product so as to adapt to a more complicated environment.

11 Claims, 3 Drawing Sheets

WATERPROOF BACKLIGHT MODULE

FIELD OF THE INVENTION

The present invention relates to a waterproof structure of a mobile terminal product having display panel, and more particularly to a waterproof backlight module of the product.

BACKGROUND OF THE INVENTION

During using a mobile terminal such as a communication product (a representation thereof is mobile phone) and a Pad-like product, it is hard to prevent the product from water. For the designs nowadays, water usually permeates into panels when the product is contacted with water incautiously. The display quality would be poor when the product is a little affected by the permeated water, and the product would be damaged when the product is greatly affected by the permeated water. In a conventional product design, there are two ways through which water permeates into the modules. The first way is a gap between a backlight module and the display panel. The second way is a gap between a frame and a reflection piece. Accordingly, the problem of waterproof can be effectively solved by improvement of above mentioned details.

SUMMARY OF THE INVENTION

In order to overcome the drawbacks above, the present invention provides a waterproof backlight module.

The waterproof backlight module comprises a light guiding plate, a reflection plate at the bottom of the light guiding plate, an optical film and a display panel disposed sequentially above the light guiding plate, and a frame disposed at a flank of the light guiding plate and the optical film, wherein a waterproof sealant is disposed at the flank of the display panel, a connection region where the display panel connects the frame, and a connection gap between the frame and the reflection plate, respectively.

Wherein, a first seal groove is disposed at an end of the frame near the display panel, the first seal groove is stepped and comprises a first step surface and a second step surface, and the waterproof sealant is stuck to the flank of the first step surface and the display panel.

Or, a second seal groove is disposed at an end of the frame near the reflection plate, the second seal groove faces the reflection plate and is stepped, and the second seal groove comprises a third step surface and a fourth step surface, wherein the reflection plate is inserted into the second seal groove.

Wherein, the third step surface is flush with a bottom surface of the light guiding plate, a part of a reflection surface of the reflection plate extending from the flank of the light guiding plate is stuck on the third step surface, the fourth step surface is flush with a bottom surface of the reflection plate, and the waterproof sealant encapsulates a connection gap between the fourth step surface and the reflection plate.

Or, an end of the frame near the reflection plate is flush with a bottom surface of the light guiding plate, a reflection surface of the reflection plate is stuck on the bottom surface of the light guiding plate and an end surface of the frame, and the waterproof sealant encapsulates an end surface of the reflection plate and a surface of the frame. Furthermore, the end surface of the reflection plate is flush with the surface of the frame.

In another embodiment, a third seal groove is disposed at an end of the frame near the reflection plate, the third seal groove is opposite to the first seal groove and is stepped, the third seal groove comprises a fifth step surface and a sixth step surface, an end surface of the frame is flush with the light guiding plate, the reflection plate is stuck on the light guiding plate and the end surface of the frame, an end surface of the reflection plate is flush with the fifth step surface, and the waterproof sealant encapsulates the fifth step surface and the end surface of the reflection plate. Furthermore, a top surface of the waterproof sealant is flush with the sixth step surface.

The waterproof backlight module provided by the present invention can effectively prevent water from entering an electronic mobile device, so that normal operation of electronic device and circuit are not affected. The waterproof backlight module is with small structure modification, easy manufacture and obvious effect, and can improve ability of waterproof of an electronic terminal product so as to adapt to a more complicated environment.

DETAILED DESCRIPTION OF PREFERRED EMBODIMENTS

The present invention will now be described more specifically with reference to the following embodiments.

Embodiment 1

Figure 1:
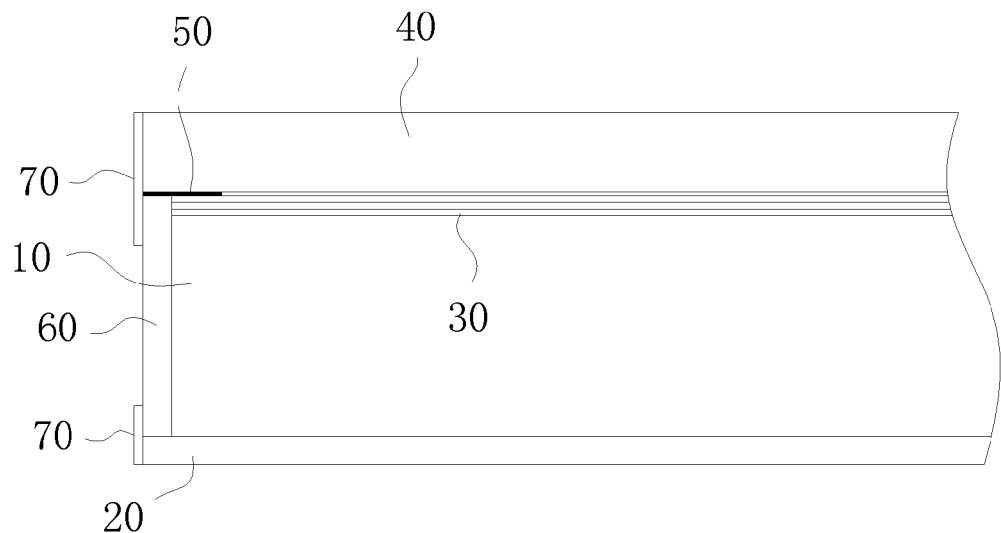
FIG. 1 is a schematic diagram according to embodiment 1 of the present invention.

As shown in FIG. 1, the waterproof backlight module comprises a light guiding plate 10, a reflection plate 20 at the bottom of the light guiding plate 10, and an optical film 30 and a display panel 40 disposed sequentially above the light guiding plate 10, wherein a black mask layer 50 is disposed at a border between the optical film 30 and the display panel 40, and a frame 60 is disposed at a flank of the light guiding plate 10 and the optical film 30. Specifically, a waterproof sealant 70 is disposed at the flank of the display panel 40, a connection region where the display panel 40 connects the frame 60, and a connection gap between the frame 60 and the reflection plate 20, respectively. Furthermore, the flank of the display panel 40 are whole encapsulated by the waterproof sealant 70. It can be seen from the figure that an outer surface of the frame 60 is flush with the flank of the display panel 40 and the flank of the reflection plate 20, and the waterproof sealant seals connection gaps therebetween. Although the waterproof sealant is higher and is not good for normal fabrication, the sealed structure still prevents mist in the circumstance from entering into the interior of the display panel, and affection on normal operation of the electronic device is prevented.

In order to achieve a better fabrication, the object of the present invention could be achieved through other solutions described below.

Embodiment 2

Figure 2:
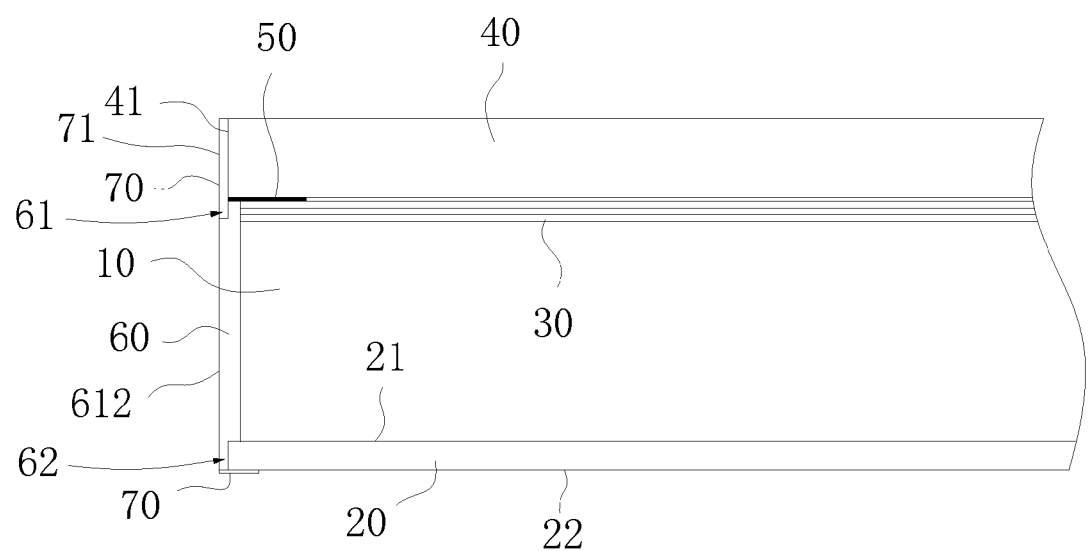
FIG. 2 is a schematic diagram according to embodiment 2 of the present invention.
Figure 3:
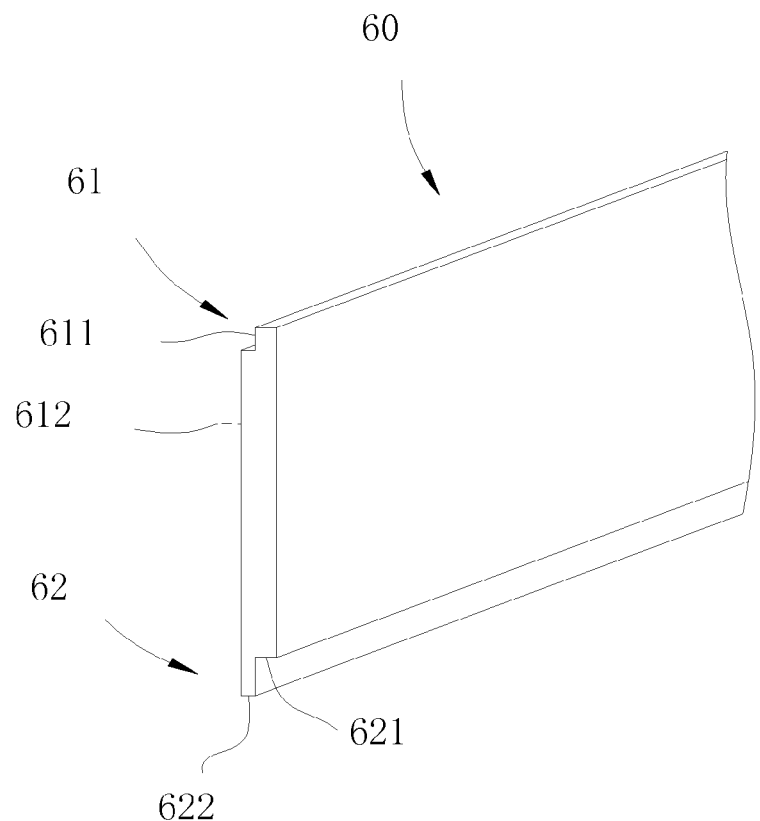
FIG. 3 is a schematic diagram of a frame according to embodiment 2 of the present invention.

The difference between the present embodiment and the embodiment 1 is that a seal groove is disposed at the frame 60, as shown in FIG. 2 and FIG. 3. A first seal groove 61 is disposed at an end of the frame 60 near the display panel 40, the first seal groove 61 is stepped and comprises a first step surface 611 and a second step surface 612, and the waterproof sealant 70 is stuck to the flank of the first step surface 611 and the flank of the display panel 40. The first step surface 611 is flush with the flank of display panel 40, and an upper surface 71 of the waterproof sealant 70 is flush with the second step surface 612. At the same time, a second seal groove 62 is disposed at an end of the frame 60 near the reflection plate 20, the second seal groove 62 faces the reflection plate 20 and is stepped, and the second seal groove 62 comprises a third step surface 621 and a fourth step surface 622, wherein the reflection plate 20 is inserted into the second seal groove 62. The third step surface 621 is flush with a bottom surface of the light guiding plate 10, a part of a reflection surface 21 of the reflection plate 20 extending from the flank of the light guiding plate 10 is stuck on the third step surface 621, the fourth step surface 622 is flush with a bottom surface 22 of the reflection plate 20, and the waterproof sealant 70 encapsulates a connection gap between the fourth step surface 622 and the reflection plate 20. By doing so, the waterproof sealant encapsulates the flank of the display panel 40 is flush with the upper surface of the frame 60 and the second step surface 612 to make the normal fabrication with ease.

Embodiment 3

Figure 4:
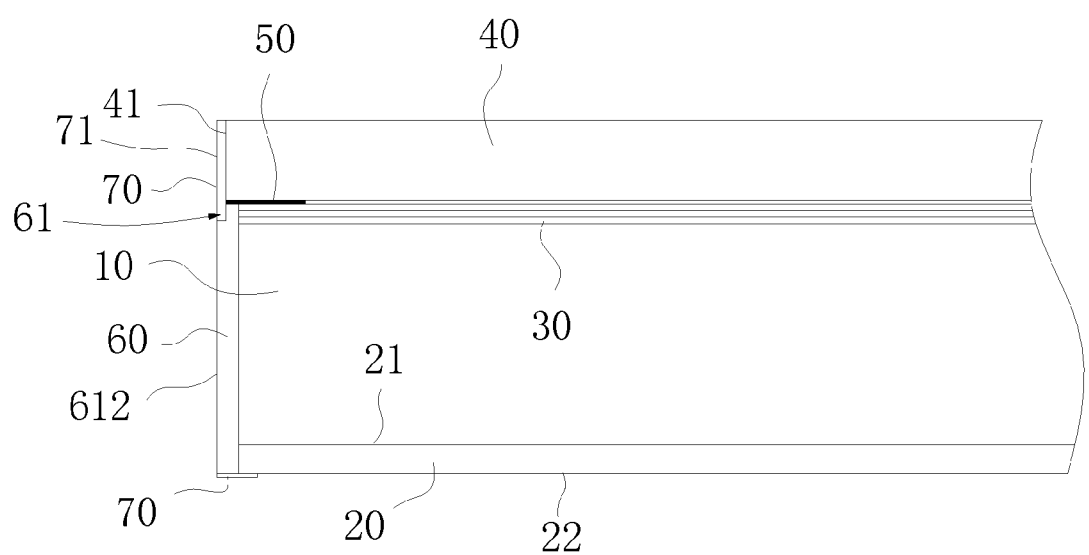
FIG. 4 is a schematic diagram according to embodiment 3 of the present invention.

Refer to FIG. 4, the difference between the present embodiment and the embodiment 2 is that an end of the frame 60 near the reflection plate 20 is flush with a bottom surface of the light guiding plate 10, and the waterproof sealant 70 is stuck on the end of the frame 60 and the bottom surface of the light guiding plate 10.

Embodiment 4

Figure 5:
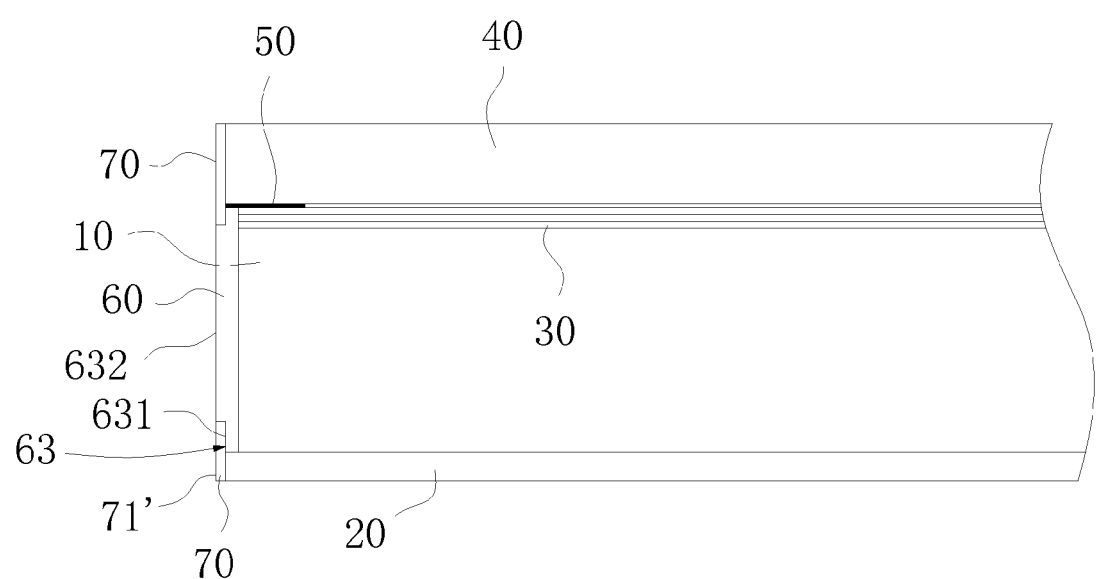
FIG. 5 is a schematic diagram according to embodiment 4 of the present invention.

As shown in FIG. 5, the difference between the embodiment 2 and the present embodiment is that a third seal groove 63 is disposed at an end of the frame 60 near the reflection plate 20, the third seal groove 63 is opposite to the first seal groove 61 and is stepped, the third seal groove 63 comprises a fifth step surface 631 and a sixth step surface 632, an end surface of the frame 60 is flush with the light guiding plate 10, the reflection plate 20 is stuck on the light guiding plate 10 and the end surface of the frame 60, an end surface of the reflection plate 20 is flush with the fifth step surface 631, and the waterproof sealant 70 encapsulates the fifth step surface 631 and the end surface of the reflection plate 20. Furthermore, a top surface 71' of the waterproof sealant 70 is flush with the sixth step surface 632.

The description made above is only the embodiment of the present application. It is noted that those with ordinary skill in the technique field could make various modifications and polishes within the theory of the present application, and these modifications and polishes should be deemed as the protection scope of the present application.

What is claimed is:

1. A waterproof backlight module comprising a light guiding plate, a reflection plate at the bottom of the light guiding plate, an optical film and a display panel disposed sequentially above the light guiding plate, and a frame disposed at a flank of the light guiding plate and the optical film, wherein a waterproof sealant is disposed at the flank of the display panel, a connection region where the display panel connects the frame, and a connection gap between the frame and the reflection plate, respectively, wherein a first seal groove is disposed at an end of the frame near the display panel, the first seal groove is stepped and comprises a first step surface and a second step surface, and the waterproof sealant is stuck to the flank of the first step surface and the display panel.

2. The waterproof backlight module according to claim 1, wherein the first step surface is flush with the flank of display panel, and an upper surface of the waterproof sealant is flush with the second step surface.

3. The waterproof backlight module according to claim 2, wherein a second seal groove is disposed at an end of the frame near the reflection plate, the second seal groove faces the reflection plate and is stepped, and the second seal groove comprises a third step surface and a fourth step surface, wherein the reflection plate is inserted into the second seal groove.

4. The waterproof backlight module according to claim 2, wherein an end of the frame near the reflection plate is flush with a bottom surface of the light guiding plate, a reflection surface of the reflection plate is stuck on the bottom surface of the light guiding plate and an end surface of the frame, and the waterproof sealant encapsulates an end surface of the reflection plate and a surface of the frame.

5. The waterproof backlight module according to claim 2, wherein a third seal groove is disposed at an end of the frame near the reflection plate, the third seal groove is opposite to the first seal groove and is stepped, the third seal groove comprises a fifth step surface and a sixth step surface, an end surface of the frame is flush with the light guiding plate, the reflection plate is stuck on the light guiding plate and the end surface of the frame, an end surface of the reflection plate is flush with the fifth step surface, and the waterproof sealant encapsulates the fifth step surface and the end surface of the reflection plate.

6. The waterproof backlight module according to claim 1, wherein a second seal groove is disposed at an end of the frame near the reflection plate, the second seal groove faces the reflection plate and is stepped, and the second seal groove comprises a third step surface and a fourth step surface, wherein the reflection plate is inserted into the second seal groove.

7. The waterproof backlight module according to claim 1, wherein an end of the frame near the reflection plate is flush with a bottom surface of the light guiding plate, a reflection surface of the reflection plate is stuck on the bottom surface of the light guiding plate and an end surface of the frame, and the waterproof sealant encapsulates an end surface of the reflection plate and a surface of the frame.

8. The waterproof backlight module according to claim 1, wherein a third seal groove is disposed at an end of the frame near the reflection plate, the third seal groove is opposite to the first seal groove and is stepped, the third seal groove comprises a fifth step surface and a sixth step surface, an end surface of the frame is flush with the light guiding plate, the reflection plate is stuck on the light guiding plate and the end surface of the frame, an end surface of the reflection plate is flush with the fifth step surface, and the waterproof sealant encapsulates the fifth step surface and the end surface of the reflection plate.

9. The waterproof backlight module according to claim 8, wherein a top surface of the waterproof sealant is flush with the sixth step surface.

10. A waterproof backlight module comprising a light guiding plate, a reflection plate at the bottom of the light guiding plate, an optical film and a display panel disposed sequentially above the light guiding plate, and a frame disposed at a flank of the light guiding plate and the optical film, wherein a waterproof sealant is disposed at the flank of the display panel, a connection region where the display panel connects the frame, and a connection gap between the frame and the reflection plate, respectively, wherein a second seal groove is disposed at an end of the frame near the reflection plate, the second seal groove faces the reflection plate and is stepped, and the second seal groove comprises a third step surface and a fourth step surface, wherein the reflection plate is inserted into the second seal groove.

11. The waterproof backlight module according to claim 10, wherein the third step surface is flush with a bottom surface of the light guiding plate, a part of a reflection surface of the reflection plate extending from the flank of the light guiding plate is stuck on the third step surface, the fourth step surface is flush with a bottom surface of the reflection plate, and the waterproof sealant encapsulates a connection gap between the fourth step surface and the reflection plate.

\* \* \* \* \*